US009360654B2

(12) United States Patent
Mitarai

(10) Patent No.: US 9,360,654 B2
(45) Date of Patent: Jun. 7, 2016

(54) LENS DEVICE AND METHOD OF CONTROLLING FOCUS

(71) Applicant: FUJIFILM Corporation, Tokyo (JP)

(72) Inventor: Tsuyoshi Mitarai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 312 days.

(21) Appl. No.: 14/040,794

(22) Filed: Sep. 30, 2013

(65) Prior Publication Data
US 2014/0029121 A1 Jan. 30, 2014

Related U.S. Application Data

(63) Continuation of application No. PCT/JP2012/056354, filed on Mar. 13, 2012.

(30) Foreign Application Priority Data

Mar. 28, 2011 (JP) .................................. 2011-070295

(51) Int. Cl.
G02B 7/02 (2006.01)
G02B 7/09 (2006.01)
(Continued)

(52) U.S. Cl.
CPC *G02B 7/09* (2013.01); *G02B 7/102* (2013.01); *H04N 5/23212* (2013.01); *G03B 3/10* (2013.01)

(58) Field of Classification Search
CPC ............ G02B 7/08; G02B 7/09; G02B 7/102; G02B 7/06; G02B 2027/0138; G02B 7/285; H04N 5/23212; H04N 5/23216; H04N 5/23293; H04N 5/23245; H04N 5/2254; H04N 5/2258
USPC ......... 359/825, 738, 739, 811, 823, 694, 701; 396/502, 100, 18, 201, 263, 281
See application file for complete search history.

(56) References Cited

U.S. PATENT DOCUMENTS 7,756,410 B2 * 7/2010 Senba .................... G03B 17/18
362/8
2007/0147818 A1 * 6/2007 Mori ...................... G02B 7/102
396/144

(Continued)

FOREIGN PATENT DOCUMENTS

EP 2007-60091 3/2007
EP 2 290 419 3/2011

(Continued)

OTHER PUBLICATIONS

International Search Report PCT/JP2012/056354 dated Jun. 19, 2012, with English translation (PCT/ISA/210).

(Continued)

*Primary Examiner* — Ricky Mack
*Assistant Examiner* — Daniele Manikeu
(74) *Attorney, Agent, or Firm* — Young & Thompson

(57) ABSTRACT

A lens device comprising a barrel body which movably holds a focus lens in an optical axis direction; a focus ring provided on an outer circumferential part of the barrel body and having a regulated rotation range; a rotation position detecting unit which detects a rotation position in the rotation range of the focus ring; a touch sensor provided on the outer circumferential part of the barrel body so as to be adjacent to the focus ring; and a control device which perform absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction.

18 Claims, 8 Drawing Sheets

(51) Int. Cl.
*H04N 5/232* (2006.01)
*G02B 7/10* (2006.01)
*G03B 3/10* (2006.01)

(56) References Cited

U.S. PATENT DOCUMENTS

| | | | |
|---|---|---|---|
| 2008/0122945 A1* | 5/2008 | Ahonen | H03K 17/9662 348/223.1 |
| 2009/0034956 A1 | 2/2009 | Tomosada | |
| 2011/0206361 A1* | 8/2011 | Iwamoto | G03B 9/62 396/263 |
| 2012/0314120 A1* | 12/2012 | Nakayama | G03B 13/36 348/345 |

FOREIGN PATENT DOCUMENTS

| JP | 09297336 A * | 11/1997 |
|---|---|---|
| JP | 10-111448 | 4/1998 |
| JP | 2007-178633 | 7/2007 |
| JP | 2008-009261 | 1/2008 |
| JP | 2009-031654 | 2/2009 |
| JP | 2009-169266 | 7/2009 |
| JP | 2010-117444 | 5/2010 |

OTHER PUBLICATIONS

Written Opinion of the International Searching Authority PCT/JP2012/056354 dated Jun. 19, 2012 (PCT/ISA/237).
International Preliminary Report on Patentability PCT/JP2012/056354 dated Jul. 2, 2013 (PCT/IPEA/409).
Chinese Office Action dated Mar. 3, 2015, with English translation; Application No. 201280015399.X.
Japanese Office Action dated Mar. 3, 2015, with English translation; Application No. 2013-507352.
Extented European Search Report—EP 12 76 3595—Jul. 16, 2014.
Extended European Search Report—EP 12 76 3595—Jul. 24, 2014.

* cited by examiner

LENS DEVICE AND METHOD OF CONTROLLING FOCUS

CROSS-REFERENCE TO RELATED APPLICATIONS

This application is a continuation application and claims the priority benefit under 35 U.S.C. §120 of PCT Application No. PCT/JP2012/056354 filed on Mar. 13, 2012 which application designates the U.S., and also claims the priority benefit under 35 U.S.C. §119 of Japanese Patent Application No. 2011-070295 filed on Mar. 28, 2011, which applications are all hereby incorporated by reference in their entireties.

BACKGROUND OF THE INVENTION

1. Field of the Invention

The present invention relates to a lens device and focus control method capable of omitting a component for sliding operation and also improving operability of absolute position indicating operation and relative position indicating operation in focus adjustment.

2. Description of the Related Art

Conventionally, as depicted in FIG. 8, a lens device has been known in a lens barrel 91 has an outer circumferential part provided with a focus ring 93 capable of sliding operation forward and backward (an arrow direction in the drawing) in an optical axis O direction.

Also, Japanese Patent Application Laid-Open No. 2007-178633 (hereinafter referred to as Patent Literature 1) discloses a lens device in which a focus ring of a relative position indication type and a focus ring of an absolute position indication type are placed on an outer circumferential part of a lens barrel 1 and switching is mechanically made to enable either one of these two focus rings by performing a sliding operation of the focus ring of the relative position indication type along an optical axis direction.

A lens device has also been known in which a touch sensor is provided on an outer circumferential part of a lens barrel and an indicating operation is possible with the touch sensor (refer to Japanese Patent Application Laid-Open No. 2009-169266, Japanese Patent Application Laid-Open No. 2010-117444, Japanese Patent Application Laid-Open No. 10-111448: hereinafter referred to as Patent Literatures 2 to 4 respectively).

A structure is also known in which a key is operated for rough adjustment for focusing is performed and a wheel is operated for fine adjustment (refer to Japanese Patent Application Laid-Open No. 2009-31654: hereinafter referred to as Patent Literature 5).

In the structure as depicted in FIG. 8 where switching is made between absolute position indication and relative position indication by a mechanical sliding operation of the focus ring, there are problems as follows: reflecting the force amount and feel at the time of switching is not easy, the number of components for sliding operation increases on the outer circumference of the barrel, and detection of switching is difficult.

While Patent Literatures 2 to 4 disclose the structure in which a focus indicating operation can be performed with a touch sensor, these patent literatures do not describe at all switching between absolute position indication and relative position indication. Patent Literature 5 does not have any disclosure regarding touch operation.

It can be thought that a touch sensor for absolute position indication and a touch sensor for relative position indication are provided on the outer circumferential part of the lens barrel. If such a structure as described above is assumed, it is hard for an operator with an operation feeling of rotating a focus ring with reference to a regulation end (a rotation end) that regulates a rotation range to use the touch sensor to operate with reference to the regulation end, and therefore a new problem occurs in which the structure would not be acceptable to the operator.

Moreover, Patent Literature 2 describes that a touching finger is moved quickly for rough focus adjustment and the touching finger is moved slowly for fine focus adjustment. However, in general, there is a difference in slowness and quickness of finger movement between the feeling of the operator and detection on a lens device side. Therefore, there is another problem in which, in practice, it is difficult to perform operation so as to distinguish between rough adjustment and fine adjustment only with slowness and quickness of finger movement.

In particular, for television camera operators operating by hand with feeling while viewing a finder, the sense of touch is important, and further improvement in operability is demanded.

SUMMARY OF THE INVENTION

The present invention was made in view of these circumstances, and has an object of providing a lens device and focus control method capable of omitting a component for sliding operation and also improving operability of absolute position indicating operation and relative position indicating operation in focus adjustment.

To achieve the object above, the present invention provides a lens device including a barrel body which movably holds a focus lens in an optical axis direction, a focus ring provided on an outer circumferential part of the barrel body and having a regulated rotation range, a rotation position detecting unit which detects a rotation position in the rotation range of the focus ring, a touch sensor provided on the outer circumferential part of the barrel body, and a control device which perform absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction.

That is, a conventional operation of sliding the focus ring can be omitted, and absolute position indication can be made with an operation of rotating the focus ring and relative position indication can be made with a sliding operation on the touch sensor. Therefore, a component for sliding operation can be omitted and, with the omission of sliding operation, operability in absolution position indicating operation and relative position indicating operation for focus adjustment can be improved.

In one embodiment, an annular projection is provided between the focus ring and the touch sensor in the optical axis direction. With this, an erroneous operation of operating both of the focus ring and the touch sensor is prevented.

In one embodiment, the control device has an autofocus control function of moving the focus lens to a position where a subject is automatically focused, and starts an operation of autofocusing of the focus lens if a touch has been detected at the touch sensor. Also, if sliding has been detected at the touch sensor after end of the autofocusing, the control device moves the focus lens to the relative position corresponding to the sliding amount on the touch sensor with reference to an absolute position determined by the autofocusing. With this, not only a switch for performing autofocusing can be omitted, but also autofocusing and fine adjustment can be easily performed only with an operation on the touch sensor (a touch and sliding).

In one embodiment, the control device performs rough adjustment of a position of the focus lens according to rotation of the focus ring, and performs fine adjustment of the position of the focus lens according to the sliding amount on the touch sensor.

Also, the present invention provides a focus control method using a barrel body which movably holds a focus lens in an optical axis direction, a focus ring provided on an outer circumferential part of the barrel body and having a regulated rotation range, a rotation position detecting unit which detects a rotation position in the rotation range of the focus ring, and a touch sensor provided on the outer circumferential part of the barrel body, the method including performing absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction.

According to the present invention, a component for sliding operation can be omitted, and operability of absolute position indicating operation and relative position indicating operation in focus adjustment can be improved.

DETAILED DESCRIPTION OF THE PREFERRED EMBODIMENTS

Embodiments of the present invention are described in detail below according to the attached drawings.

Figure 1:
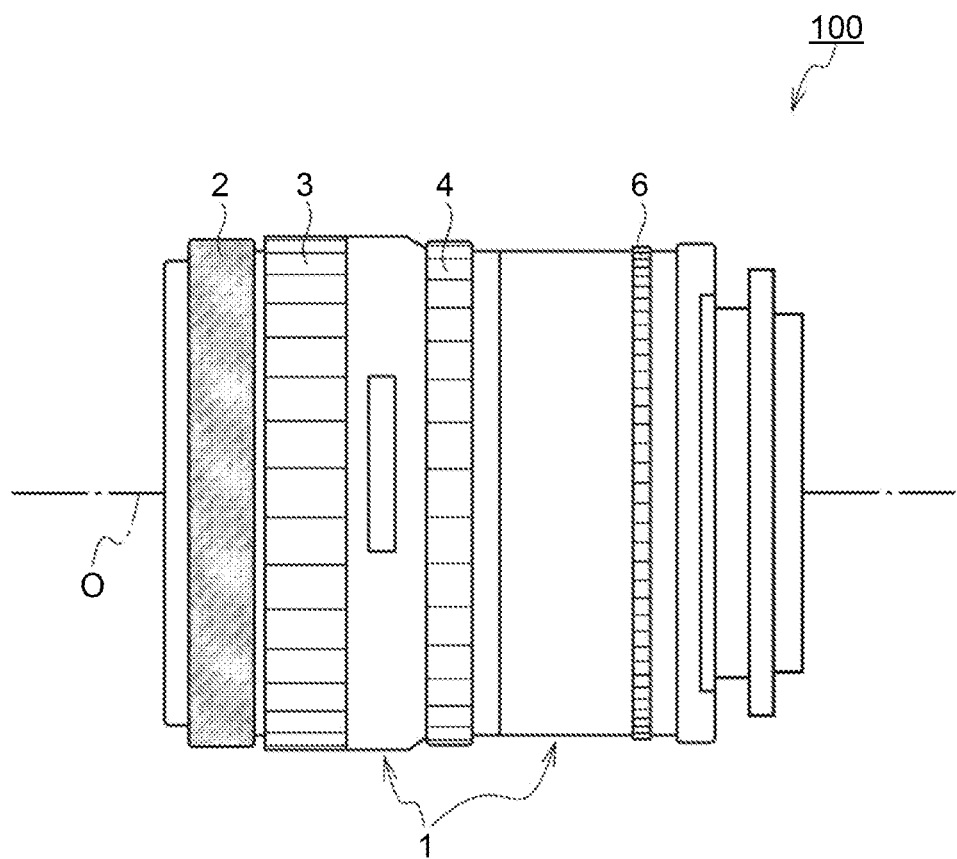
FIG. 1 is a side view depicting an example of a lens device according to the present invention.

FIG. 1 is a side view depicting an example of a lens device according to the present invention. In a lens device 100 of FIG. 1, on an outer circumferential part of a fixed ring 1 (hereinafter also referred to as a "barrel body"), a touch sensor 2, a focus ring 3, a zoom ring 4, and an iris ring 6 are placed, sequentially from a subject side (a front side). In this example, the touch sensor 2 and the focus ring 3 are placed so as to be adjacent to each other in an optical axis O direction.

The touch sensor 2 of this example has an annular shape, is provided endlessly on the outer circumferential part of the fixed ring 1, and can detect any sliding of a finger in an outer circumferential direction of the fixed ring 1 with the optical axis O as a center.

The focus ring 3 has an annular shape, is provided with a rotation range regulated with a regulation end (hereinafter also referred to as a "rotation end") on the outer circumferential part of the fixed ring 1, and can rotate in the outer circumferential direction of the fixed ring 1 with the optical axis O as a center in the regulated rotation range.

The zoom ring 4 and the iris ring 6 each have an annular shape, and can freely rotate in the outer circumferential direction of the fixed ring 1 with the optical axis O as a center.

Figure 2:
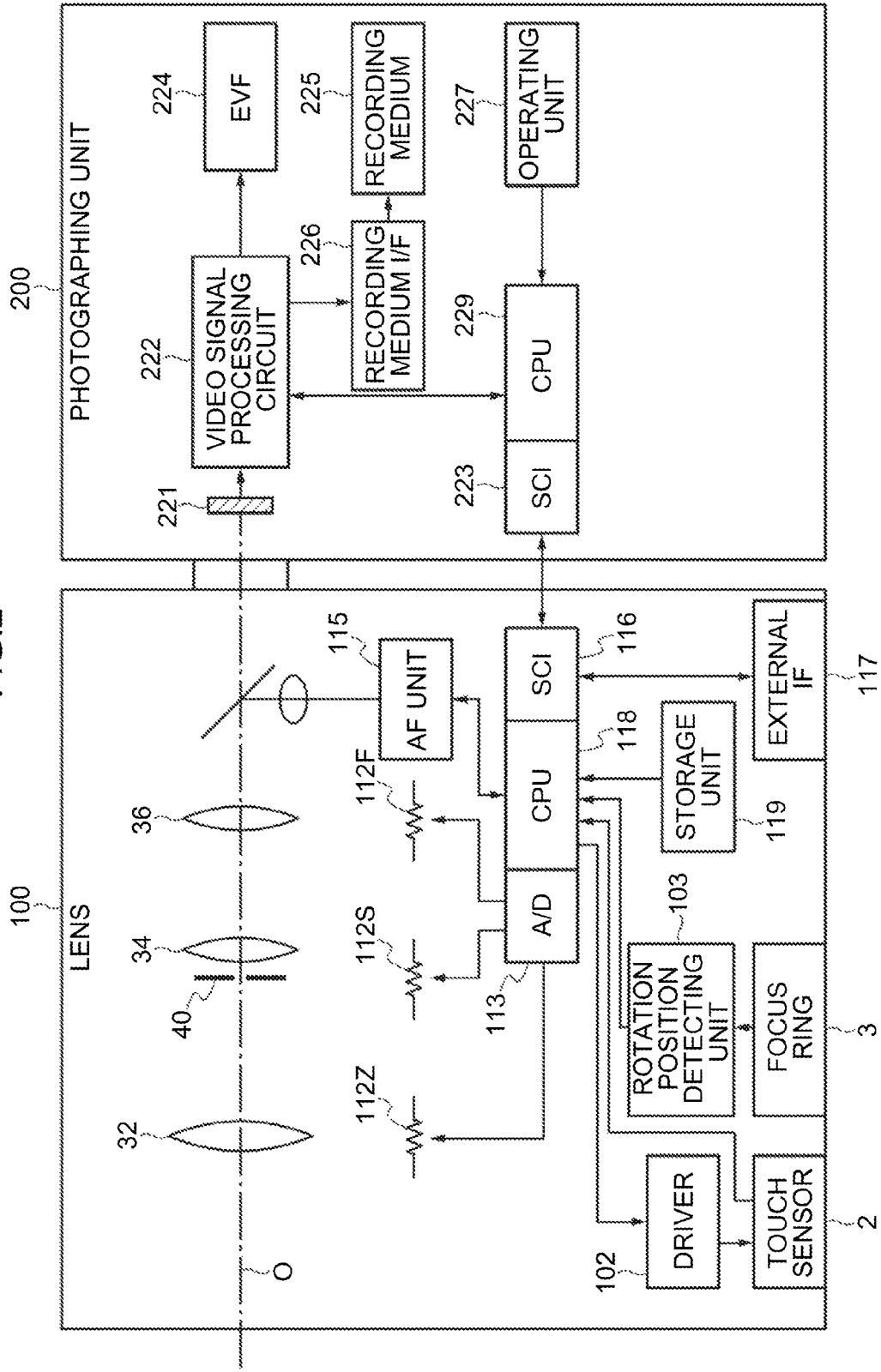
FIG. 2 is a block diagram depicting an example of a photographing device with the lens device depicted in FIG. 1 mounted thereon.

FIG. 2 is a block diagram depicting an example of the lens device 100 depicted in FIG. 1 and a photographing device configured by mounting the lens device 100 on a photographing unit 200. Note that components in FIG. 2 identical to those depicted in FIG. 1 are provided with the same reference numerals, and details already described are not described herein.

In FIG. 2, in the lens device 100 of this example, a zoom (a variable magnification) lens 32, an iris 40 (an aperture), a master lens 34, and a focus lens 36 are placed, sequentially from a subject side (a front side). These optical members are held in the fixed ring 1 of FIG. 1. While the lens 100 of this example is of a rear focus type, the order of the optical members on the optical axis O are not particularly restrictive in the present invention.

Also, the lens device 100 is configured to include a driver 102 that drives the touch sensor 2, a rotation position detecting unit 103 that detects a rotation position in the regulated rotation range of the focus ring 3, drivers 112Z, 112F, and 112S that drive the zoom lens 32, the focus lens 36, and the iris 40, respectively, an A/D converter 113, an AF unit 115 that performs a process for autofocusing, a SCI interface 116 for performing intra-system communication with the photographing unit 200, an external interface 117 for performing communication with another external device, a CPU 118 that controls each unit of the lens device 100 in a centralized manner, and a storage unit 119.

The zoom lens 32 and the focus lens 36 freely move in the optical axis O direction with instructions from the CPU 118 via the drivers 112Z and the 112F. Also, the iris 40 changes its open section area on an optical path along the optical axis O, upon an instruction from the CPU 118 via the driver 112S. As the driver 102 for the touch sensor 2 and the rotation position detecting unit 103 for the focus ring 3, known sensors are used, and their detailed description is omitted herein.

The CPU 118 of the lens device 100 cooperates with the AF unit 115 at the time of autofocusing, causing the AF unit 115 to conduct an AF search of a contrast AF type while causing the focus lens 36 to move in the optical axis O direction and, based on the AF result, causing the focus lens 36 to move to a lens position focusing on a subject (hereinafter referred to as an "AF absolute position"). Also, when the focus ring 3 is rotated, the CPU 118 of the lens device 100 performs absolute position control of causing the focus lens 36 to move to an absolute position (hereinafter referred to as an "MF absolute position") corresponding to the rotation position of the focus ring 3 detected by the rotation position detecting unit 103. Also, when a finger touch or sliding is detected by the touch sensor 2, the CPU 118 of the lens device 100 performs relative position control of causing the focus lens 36 to move to a relative position corresponding to a sliding amount in a circumferential direction on the outer circumferential surface of the touch sensor 2. Here, "relative position" means a lens position of the focus lens 36 (hereinafter referred to as an "MF relative position"), which is a position (difference) with reference to either one absolute position of the lens position of the focus lens 36 determined by autofocusing (AF absolute position) and the lens position of the focus lens 36 indicated by the focus ring 3 (MF absolute position) and is a lens position indicated by the touch sensor 2.

Also, the CPU 118 of the lens device 100 performs rough adjustment of the position of the focus ring 3 according to the rotation of the focus ring 3 and performs fine adjustment of the position of the focus lens 36 according to the sliding amount on the touch sensor 2. That is, the movement amount of the focus lens 36 in the optical axis O direction with respect to the sliding amount (or the sliding angle) of the touch sensor 2 on the outer circumference is smaller than the movement amount of the focus lens 36 in the optical axis O direction with respect to the movement amount (or the rotation angle) of the focus ring 3 on the outer circumference. Therefore, from the focus position (AF absolute position) determined by autofocusing, fine adjustment of the lens position (MF relative position) of the focus lens 36 can be easily made by the touch sensor 2.

The photographing unit 200 is configured to include, as depicted in FIG. 2, an image pickup device 221 that images a subject image formed by the lens device 100, a video signal processing circuit 222 that performs image processing on a video signal outputted from the image pickup device 221, an SCI interface 223 for intra-system communication with the lens device 1, an electronic view finder 224 which displays the imaged image obtained by the image pickup device 221, a recording medium interface 226 that records the imaged image obtained from the image pickup device 221 on a recording medium 225, an operating unit 227 that accepts operation from the operator, and a CPU 229 that controls each unit of the photographing unit 200 in a centralized manner.

Next, focus lens control in the lens device 100 is described.

Figure 3:
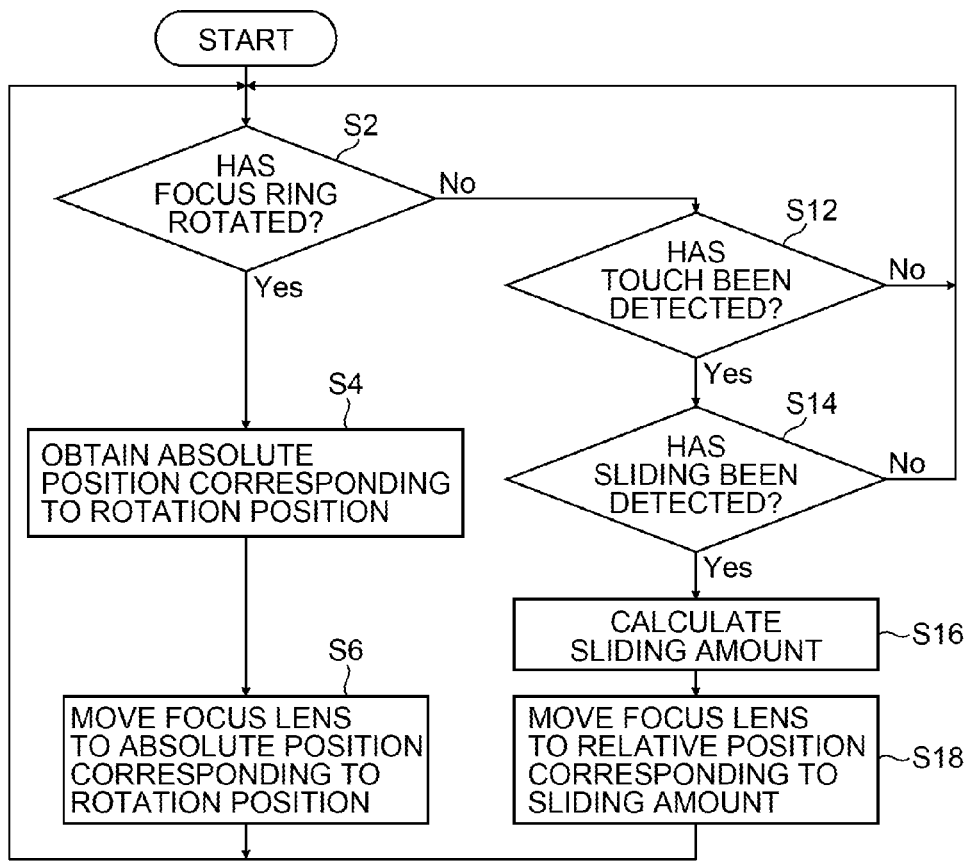
FIG. 3 is a flowchart depicting a flow of a first embodiment of a lens control process.

FIG. 3 is a flowchart depicting a flow of a first embodiment of a lens control process. This process is performed by the CPU 118 of the lens device 100 by following a program.

In the first embodiment, it is first determined whether the focus ring 3 has rotated (step S2). In this example, the CPU 118 determines whether rotation has been made based on an output signal from the rotation position detecting unit 103.

If the focus ring 3 has rotated, an absolute position of the focus lens 36 corresponding to the rotation position of the focus ring 3 is obtained (step S4), and the focus lens 36 is moved to that absolute position (step S6). In this example, relations between rotation positions of the focus ring 3 and absolute positions of the focus lens 36 are stored in the storage unit 119, and an absolute position corresponding to the rotation position is obtained from the storage unit 119. The absolute position may be calculated from the rotation position.

If the focus ring 3 has not rotated, it is determined whether a touch has been detected by the touch sensor 2 (step S12).

If a touch has been detected by the touch sensor 2, it is further determined whether sliding has been detected by the touch sensor 2 (step S14). If sliding has been detected, the sliding amount is calculated (step S16), and the focus lens 36 is moved to a relative position of the focus lens 36 corresponding to the sliding amount (step S18). For example, in the case after the focus ring 3 rotates, with reference to the MF absolute position corresponding to the rotation position, the focus lens 36 moves by a movement amount corresponding to the sliding amount on the touch sensor 2. In this example, relations between sliding amounts on the touch sensor 2 and relative positions of the focus lens 36 are stored in the storage unit 119, and a relative position corresponding to the sliding amount is obtained from the storage unit 119. The relative position may be calculated from the sliding amount.

In the first embodiment, when rotation of the focus ring 3 and sliding on the touch sensor 2 are simultaneously made, rotation of the focus ring 3 is prioritized over sliding on the touch sensor 2, and the focus lens 36 moves to the MF absolute position indicated by the focus ring 3. Therefore, even if the operator who intends to make an indication with a rotation operation of the focus ring 3 rotates the focus ring 3 and, at the same time, erroneously slides his or her finger on the touch sensor 2, the focus lens 36 moves to the absolute position indicated by the rotation operation of the focus ring 3 as intended by the operator. On the other hand, when the operator who intends to indicate a relative position with a sliding operation on the touch sensor 2 touches the touch sensor 2 and also the focus ring 3, the operator generally recognizes that he or she touched the focus ring 3 based on the sense of touch of the focus ring 3, which is apparently different from that of the touch sensor 2, and detaches his or her finger from the focus ring 3. That is, it is rare for the operator who is familiar with operation of the focus ring to try to perform sliding on the touch sensor 2 and also rotate the focus ring 3 at the same time.

Figure 4:
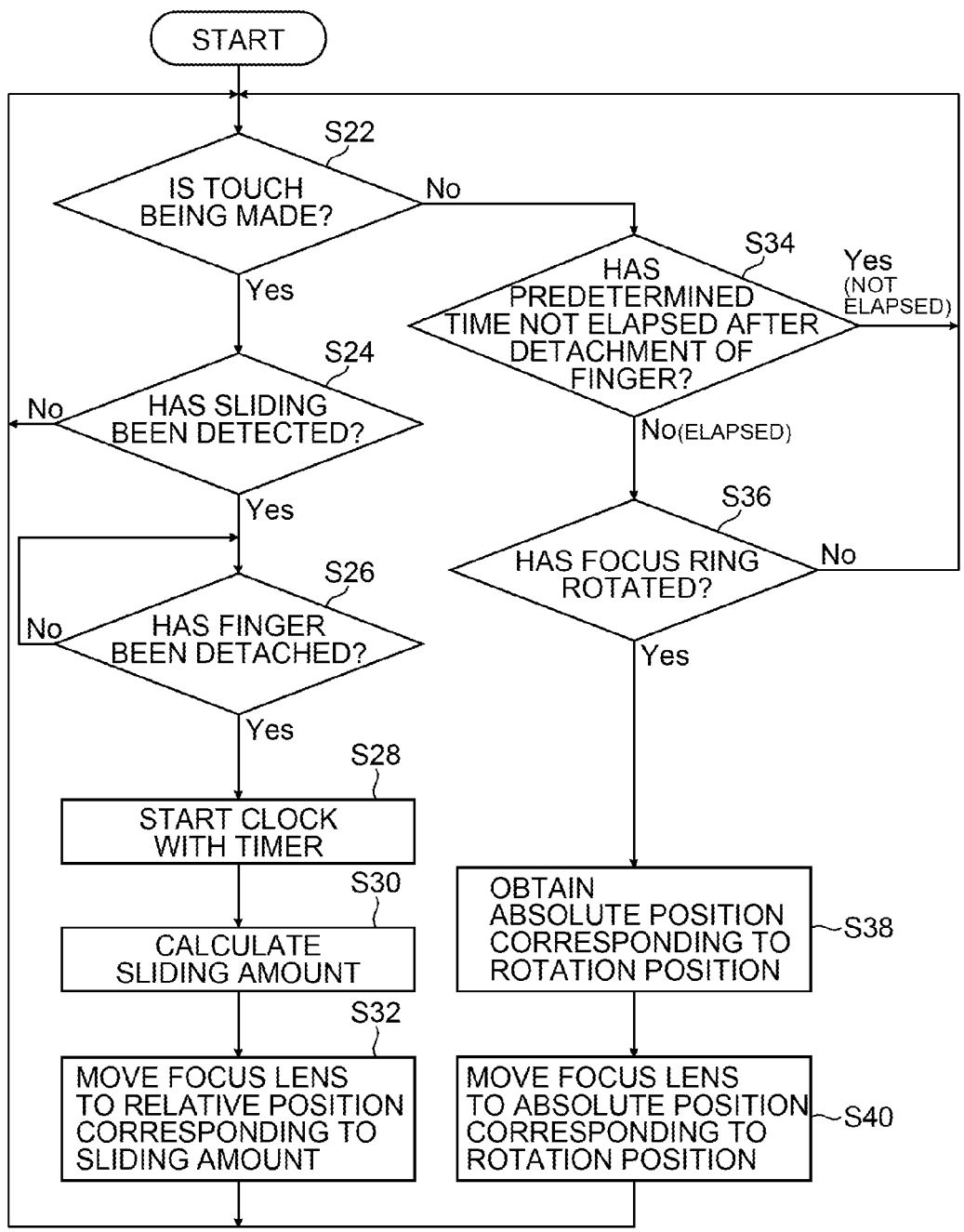
FIG. 4 is a flowchart depicting a flow of a second embodiment of the lens control process.

FIG. 4 is a flowchart depicting a flow of a second embodiment of the lens control process. This process is performed by the CPU 118 of the lens device 100 by following a program.

In the first embodiment, it is first determined whether a touch is being made on the touch sensor 2 (step S22).

When it is determined that a touch is being made on the touch sensor 2, it is further determined whether sliding has been detected by the touch sensor 2 (step S24) and whether the finger has been detached from the touch sensor 2 (step S26).

In the second embodiment, when the finger is detached from the touch sensor 2 (Yes at step S26), clock starts with a timer (step S28). Then, the sliding amount is calculated (step S30), and the focus lens 36 is moved to a relative position corresponding to the sliding amount (step S32).

When it is determined that a tough is not being made on the touch sensor 2, it is determined whether a predetermined time has elapsed after detection of detachment of the finger (step S34). If the predetermined time has not elapsed (Yes at step S34), the procedure returns to step S22.

In the second embodiment, only if the predetermined time has elapsed after detachment of the finger from the touch sensor 2, it is determined whether the focus ring 3 has rotated (step S36). If the focus ring 3 has rotated, an absolute value corresponding to the rotation position is obtained (step S38), and the focus lens 36 is moved to that absolute position (step S40).

In the second embodiment, when rotation of the focus ring 3 and sliding on the touch sensor 2 are simultaneously made, sliding on the touch sensor 2 is prioritized over rotation of the focus ring 3, and the focus lens 36 moves to the relative position indicated by the touch sensor 2. Therefore, even if the operator who intends to indicate a relative position with a sliding operation on the touch sensor 2 performs sliding on the touch sensor 2 and, at the same time, erroneously rotates the focus ring 3, the focus lens 36 moves to the relative position indicated by the sliding operation on the touch sensor 2 as intended by the operator. Also, in a touch operation, an operation of touching with a finger and sliding→detaching the finger→touching again with the finger and sliding→detaching the finger . . . may be repeated. Even in this case, the touch operation is prioritized and no reaction is made to unintentional rotation of the focus ring 3 during detachment of the finger. This is preferable for operators mainly performing a touch operation. Meanwhile, whether to perform control in the first embodiment depicted in FIG. 3 or control in the second embodiment depicted in FIG. 4 may be set in the storage 119 of the lens device 100 through communication from the photographing unit 200 by performing a switching operation at the operating unit 227 of the photographing unit 200. The CPU 118 of the lens device 100 switches control based on setting information in the storage unit 119.

Figure 5:
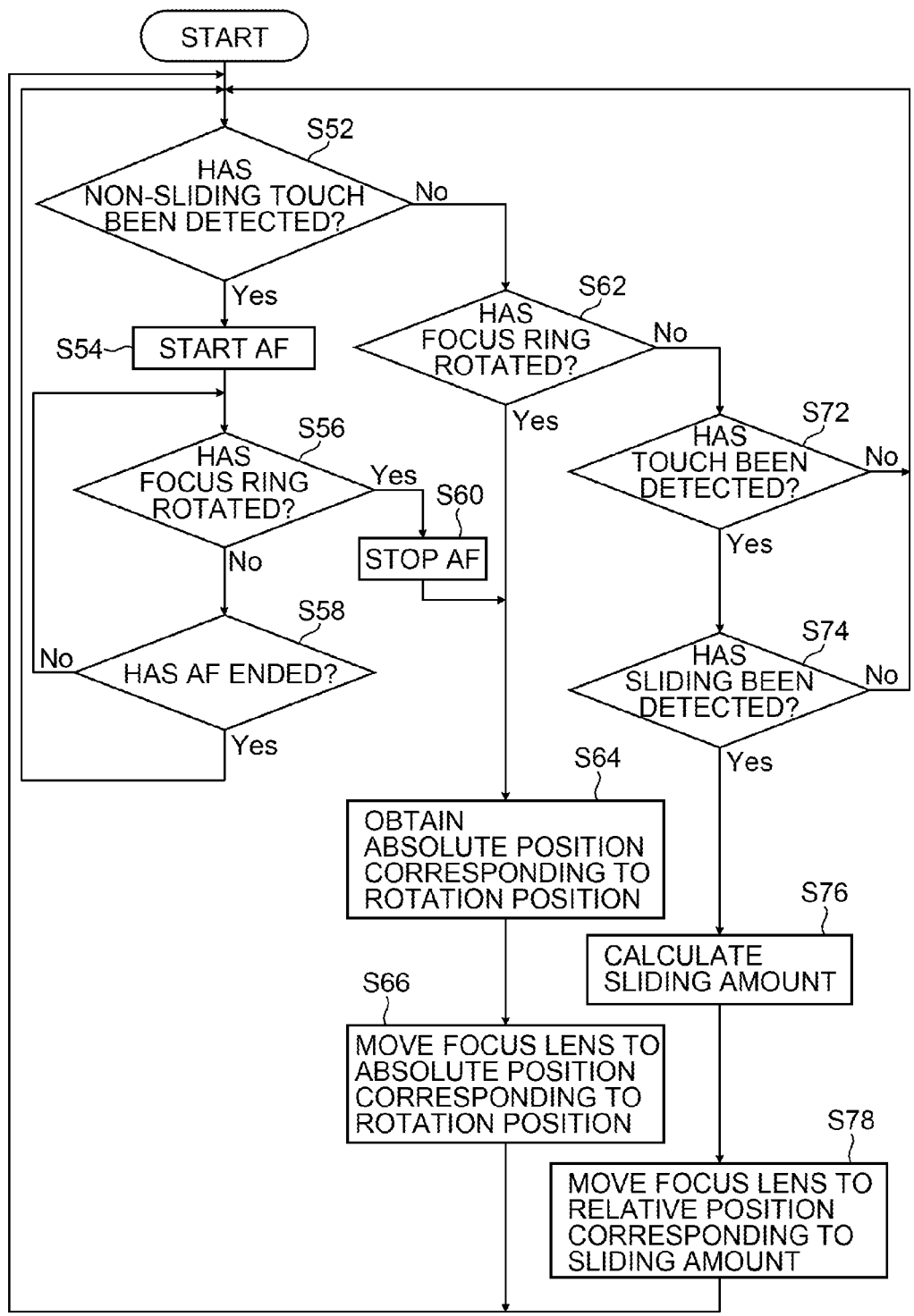
FIG. 5 is a flowchart depicting a flow of a third embodiment of the lens control process.

FIG. 5 is a flowchart depicting a flow of a third embodiment of the lens control process. This process is performed by the CPU 118 of the lens device 100 by following a program.

In the third embodiment, when a determination is made as touch detection at the touch sensor 2 and non-sliding (Yes at step S52), autofocus processing starts to move the focus lens 36 to a position where a subject is automatically focused (step S54). In the autofocus processing in this example, an AF search (focus position detection) of a contrast AF type is conducted while the focus lens 36 is moved along the optical axis O direction, and the focus lens 36 is moved to a lens position (AF absolute position) corresponding to the AF search result. The CPU 118 conducts autofocusing by using the driver 112F for the focus lens 36 and the AF unit 115.

In the case of no touch detection and no non-sliding (if a touch has not been detected or sliding has been detected), processes at steps S62 to S78 are performed. These processes at steps S62 to S78 are similar to those at steps S2 to S18 in the first embodiment depicted in FIG. 3, and are not described herein.

From the start of autofocus processing at step S54 to the end of autofocus determined at step S58, it is determined whether the focus ring 3 has rotated (step S56). If the focus ring 3 has rotated during execution of the autofocus processing, the autofocus operation is stopped (step S60), an absolute position corresponding to the rotation position of the focus ring 3 is obtained (step S64), and the focus lens 36 is moved to an absolute position (MF absolute position) corresponding to the rotation position (step S66).

In the third embodiment, an indication for the start of autofocusing can be inputted by the touch sensor 2, and therefore a switch component can be eliminated from the outer circumference of the lens barrel 1. Also, if sliding has been detected by the touch sensor 2 after the end of autofocusing (Yes at step S74), the focus lens is moved to a relative position corresponding to the sliding amount on the touch sensor 2 with reference to the absolute position (AF absolute position) determined by autofocusing (steps S76 and S78). That is, with combination of AF by a touch and relative position indication by sliding after AF, the operator can easily perform focus adjustment as intended. Furthermore, even if autofocusing starts, the autofocusing operation can be stopped by rotating the focus ring 3, and the focus lens 36 can be moved to the absolute value (MF absolute position) indicated by the focus ring 3.

Note that while the example has been described by using FIG. 5 in which rotation of the focus ring 3 is prioritized similarly to the first embodiment depicted in FIG. 3 when autofocusing is not started, the present invention is not restricted to this mode.

Figure 6:
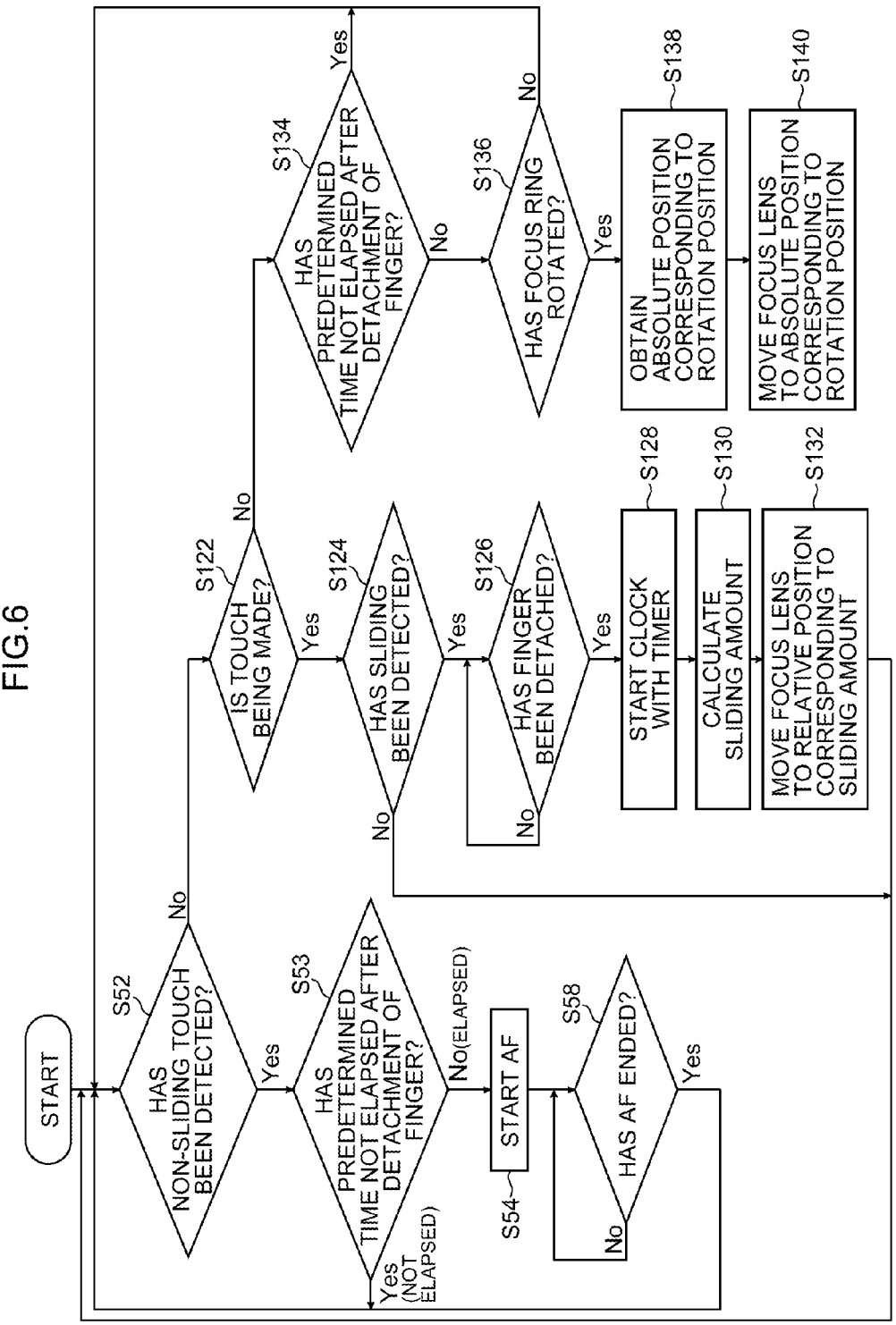
FIG. 6 is a flowchart depicting a flow of a fourth embodiment of the lens control process.

FIG. 6 is a flowchart depicting a flow of a fourth embodiment of the lens control process. This process is performed by the CPU 118 of the lens device 100 by following a program.

In FIG. 6, steps S122 to S140 are processes similar to those at steps S22 to S40 in the second embodiment depicted in FIG. 4, and are not described in the following. Also, in FIG. 6, steps S52, S54, and S58 are processes similar to those at steps provided with the same reference numerals in the third embodiment depicted in FIG. 5.

In the fourth embodiment, when a determination is made as touch detection at the touch sensor 2 and non-sliding (Yes at step S52), it is determined whether a predetermined time has elapsed after detachment of the finger after sliding for relative position indication (step S53). If the predetermined time has not elapsed yet (Yes at step S53), the procedure returns to step S52. That is, autofocusing is performed only if the predetermined time has elapsed after detection of detachment of the finger from the touch sensor 2 after sliding for relative position indication (step S54).

Figure 7:
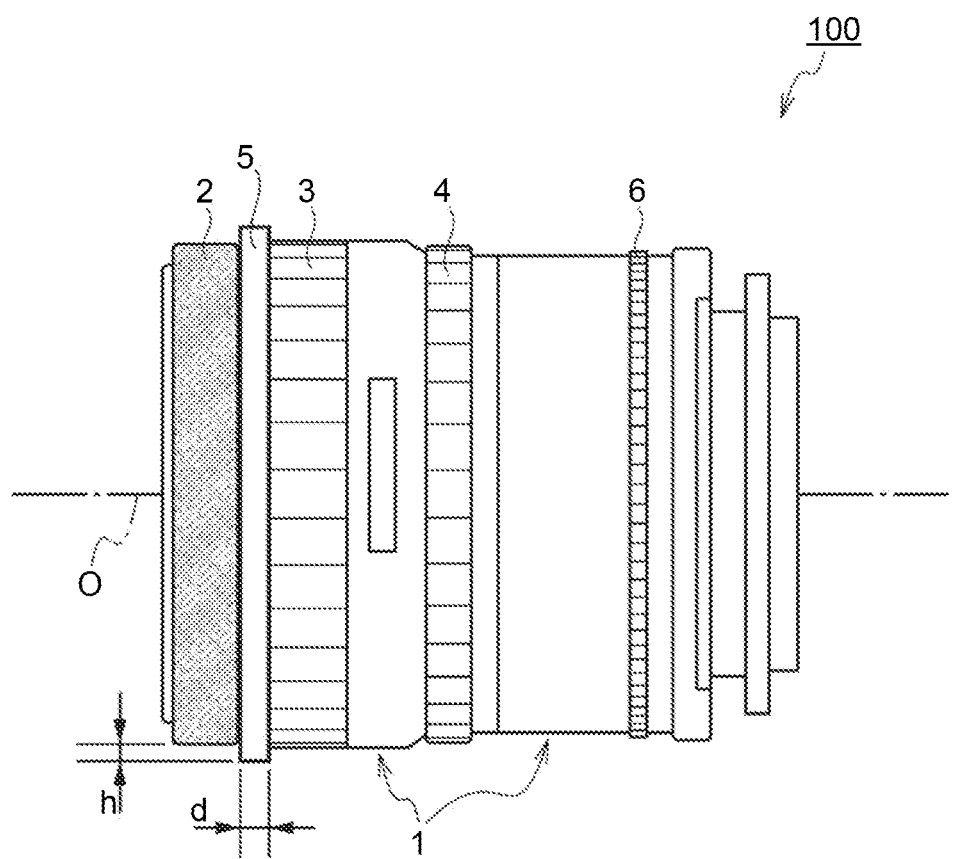
FIG. 7 is a side view depicting an example of a lens device with an annular projection provided between a focus ring and a touch sensor.
Figure 8:
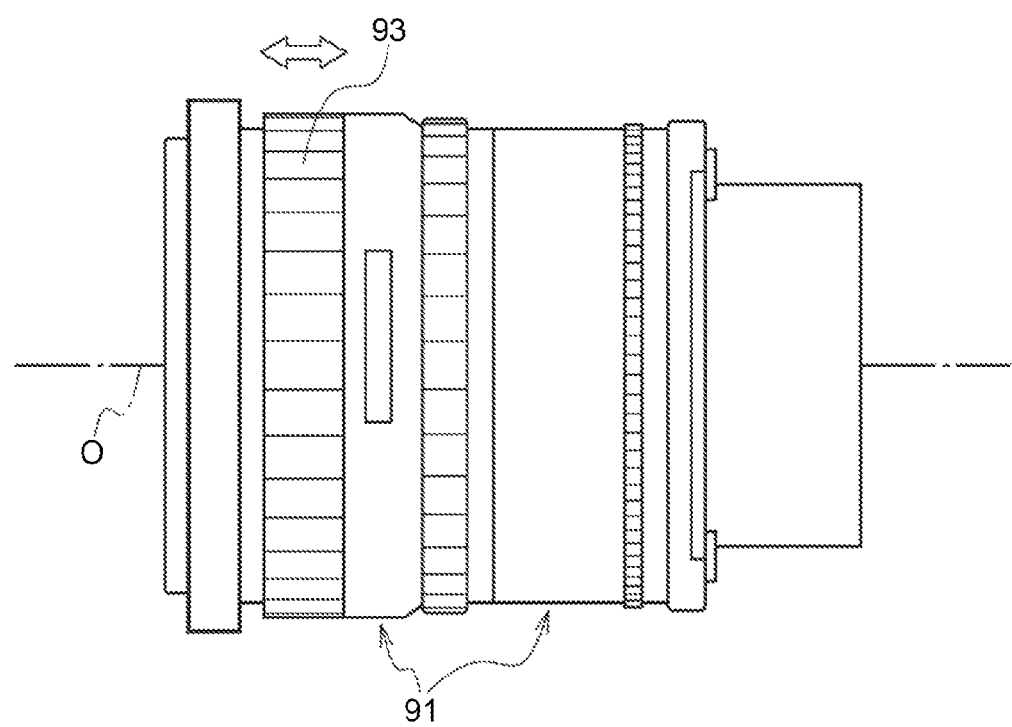
FIG. 8 is a side view depicting an example of a conventional lens device including a sliding-type focus ring.

FIG. 7 is a side view depicting an example of the lens device 100 with an annular projection 5 provided between the focus ring 3 and the touch sensor 2 in the optical axis O direction. In FIG. 7, components identical to those depicted in FIG. 1 are provided with the same reference numerals, and only differences from the case of FIG. 1 are described in the following.

The projection 5 has a width d and a height h in the optical axis O direction, which are not particularly restricted, but are set so that the finger do not touch both of the touch sensor 2 and the focus ring 3. In view of not touching both, the width d and the height h are preferable large. However, in view of alternate operation of both, operability is impaired if the width d and the height h are too large. For example, the width d is on the order of the width d of the finger, and the height h is on the order of 2 to 3 mm.

Also, to prevent erroneous operation, the CPU 118 of the lens device 100 may not react even if a touch and sliding are detected at one point of the touch sensor 2, and may not move the focus lens to a relative position corresponding to the sliding amount until a touch and sliding are detected at a plurality of points of the touch sensor 2. Regarding the focus ring 3, the case is exemplarily described above in which only rotation is detected and a touch is not detected, but the present invention is not restricted to this case. Detecting device that detects that the focus ring 3 has been touched with a finger may be provided and, if the focus ring 3 and the touch sensor 2 have both been touched, either one of the following may be performed: (1) ignore both operations, (2) prioritize rotation of the focus ring 3, and (3) prioritize operation of the touch sensor 2.

Also, device that detects whether the focus ring 3 has stopped at the regulation end which regulates the rotation range may be provided, and if it is detected that the touch sensor 2 has been touched with the focus ring 3 stopping at the regulation end, the ratio of the movement amount of the focus lens 36 with respect to the sliding amount may be decreased. That is, at the rotation end of the focus ring 3, fine adjustment may be easily made by sliding on the touch sensor 2.

While the example has been described in which whether a touch and sliding have been provided simultaneously at the plurality of points of the touch sensor 2, the touch sensor 2 is not particularly restricted to a sensor capable of detecting multi-touch (touches at a plurality of points). The present invention can be applied to the touch sensor 2 of non-multi-touch.

Furthermore, while the example has been described in which the touch sensor 2 is provided endlessly in an annular shape over the entire circumference of the fixed ring 1, the present invention can be applied to the case in which the touch sensor 2 is provided on a part of an arc of the entire circumference of the fixed ring 1.

Still further, while the example has been described in which only a focus operation is performed with a touch operation on the touch sensor 2, ON/OFF of another function may be allocated to the touch sensor 2. For example, at the time of setting a macro mode, a touch operation different from the start of AF is accepted. For example, a different function can be used depending on a different number of times of touch, sliding with a different trail (for example, a circular shape), a different sliding direction, etc. Zooming and an iris operation can be performed by the touch sensor 2, and the zoom ring 4 and the iris ring 6 can be omitted.

The present invention is not restricted to the examples described in the specification and the example depicted in the drawings, and it goes without saying that various design changes and modification may be performed within a range not deviating from the gist of the present invention.

In the specification, the following inventions are disclosed.

Invention 1: A lens device including: a barrel body which movably holds a focus lens in an optical axis direction; a focus ring provided on an outer circumferential part of the barrel body and having a regulated rotation range; a rotation position detecting unit which detects a rotation position in the rotation range of the focus ring; a touch sensor provided on the outer circumferential part of the barrel body; and a control device which perform absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction.

Invention 2: The lens device according to Invention 1, wherein an annular projection is provided between the focus ring and the touch sensor in the optical axis direction.

Invention 3: The lens device according to Invention 1 or 2, wherein the control device has an autofocus control function of moving the focus lens to a position where a subject is automatically focused, and starts an operation of autofocusing of the focus lens if a touch has been detected at the touch sensor.

Invention 4: The lens device according to Invention 3, wherein if sliding has been detected at the touch sensor after end of the autofocusing, the control device moves the focus lens to the relative position corresponding to the sliding amount on the touch sensor with reference to an absolute position determined by the autofocusing.

Invention 5: The lens device according to Invention 3 or 4, wherein if rotation of the focus ring has been detected during execution of the autofocusing, the control device stops the operation of autofocusing and moves the focus lens to the absolute position corresponding to the rotation position of the focus ring.

Invention 6: The lens device according to Invention 4 or 5, wherein the control device puts execution of the autofocusing on hold until a predetermined time elapses after detachment of a finger from the touch sensor even if a touch has been detected again at the touch sensor.

Invention 7: The lens device according to any one of Inventions 1 to 6, wherein the control device performs rough adjustment of a position of the focus lens according to rotation of the focus ring, and performs fine adjustment of the position of the focus lens according to the sliding amount on the touch sensor.

Invention 8: The lens device according to any one of Inventions 1 to 7, wherein if rotation of the focus ring and sliding on the touch sensor are simultaneously performed, the control device prioritizes the rotation of the focus ring over the sliding on the touch sensor, and causes the focus lens to move to an absolute position indicated by the focus ring.

Invention 9: The lens device according to any one of Inventions 1 to 7, wherein if rotation of the focus ring and sliding on the touch sensor are simultaneously performed, the control device prioritizes the sliding on the touch sensor over the rotation of the focus ring, and causes the focus lens to move to a relative position indicated by the touch sensor.

Invention 10: The lens device according to any one of Inventions 1 to 9, wherein the control device puts movement of the focus ring to the absolute position on hold until a predetermined time elapses after detachment of a finger from the touch sensor even if rotation of the focus ring has been detected.

Invention 11: The lens device according to any one of Inventions 1 to 10, wherein if touches and sliding have been detected at a plurality of points on the touch sensor, the control device causes the focus lens to move the relative position corresponding to the sliding amount.

Invention 12: The lens device according to any one of Inventions 1 to 11, wherein the touch sensor has an annular shape, and is provided endlessly on the outer circumferential part of the barrel body.

Invention 13: A focus control method using a barrel body which movably holds a focus lens in an optical axis direction, a focus ring provided on an outer circumferential part of the barrel body and having a regulated rotation range, a rotation position detecting unit which detects a rotation position in the rotation range of the focus ring, and a touch sensor provided on the outer circumferential part of the barrel body, the method including performing absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction. That is, a focus control method corresponding to Invention 1.

Invention 14 to Invention 24: Focus control methods corresponding to Invention 2 to Invention 12.

What is claimed is:

1. A lens device comprising:
    a barrel body which movably holds a focus lens in an optical axis direction;
    a focus ring provided on an outer circumferential part of the barrel body and having a regulated rotation range;
    a rotation position detecting unit which detects a rotation position in the rotation range of the focus ring;
    a touch sensor provided on the outer circumferential part of the barrel body so as to be adjacent to the focus ring; and
    a control device which performs absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction,
    wherein the control device has an autofocus control function of moving the focus lens to a position where a subject is automatically focused, and starts an operation of autofocusing of the focus lens if a touch has been detected at the touch sensor.

2. The lens device according to claim 1, wherein an annular projection is provided between the focus ring and the touch sensor in the optical axis direction.

3. The lens device according to claim 1, wherein if sliding has been detected at the touch sensor after end of the autofocusing, the control device moves the focus lens to the relative position corresponding to the sliding amount on the touch sensor with reference to an absolute position determined by the autofocusing.

4. The lens device according to claim 1, wherein if rotation of the focus ring has been detected during execution of the autofocusing, the control device stops the operation of autofocusing and moves the focus lens to the absolute position corresponding to the rotation position of the focus ring.

5. The lens device according to claim 3, wherein the control device puts execution of the autofocusing on hold until a predetermined time elapses after detachment of a finger from the touch sensor even if a touch has been detected again at the touch sensor.

6. The lens device according to claim 1, wherein the control device performs rough adjustment of a position of the focus lens according to rotation of the focus ring, and performs fine adjustment of the position of the focus lens according to the sliding amount on the touch sensor.

7. The lens device according to claim 1, wherein if rotation of the focus ring and sliding on the touch sensor are simultaneously performed, the control device prioritizes the rotation of the focus ring over the sliding on the touch sensor, and causes the focus lens to move to an absolute position indicated by the focus ring.

8. The lens device according to claim 1, wherein if rotation of the focus ring and sliding on the touch sensor are simultaneously performed, the control device prioritizes the sliding on the touch sensor over the rotation of the focus ring, and causes the focus lens to move to a relative position indicated by the touch sensor.

9. The lens device according to claim 1, wherein the control device puts movement of the focus ring to the absolute position on hold until a predetermined time elapses after detachment of a finger from the touch sensor even if rotation of the focus ring has been detected.

10. The lens device according to claim 1, wherein if touches and sliding have been detected at a plurality of points on the touch sensor, the control device causes the focus lens to move the relative position corresponding to the sliding amount.

11. The lens device according to claim 1, wherein the touch sensor is provided endlessly in an annular shape on the outer circumferential part of the barrel body.

12. A focus control method using a barrel body which movably holds a focus lens in an optical axis direction, a focus ring provided on an outer circumferential part of the barrel body and having a regulated rotation range, a rotation position detecting unit which detects a rotation position in the rotation range of the focus ring, a touch sensor provided on the outer circumferential part of the barrel body so as to be adjacent to the focus ring, the method comprising
performing absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction, wherein
an operation of autofocusing of the focus lens starts if a touch has been detected at the touch sensor.

13. The focus control method according to claim 12, wherein
rough adjustment of a position of the focus lens is performed according to rotation of the focus ring, and fine adjustment of the position of the focus lens is performed according to the sliding amount on the touch sensor.

14. The focus control method according to claim 12, wherein
if rotation of the focus ring and sliding on the touch sensor are simultaneously performed, the rotation of the focus ring is prioritized over the sliding on the touch sensor, and the focus lens is moved to an absolute position indicated by the focus ring.

15. The focus control method according to claim 12, wherein
if rotation of the focus ring and sliding on the touch sensor are simultaneously performed, the sliding on the touch sensor is prioritized over the rotation of the focus ring, and the focus lens is moved to a relative position indicated by the touch sensor.

16. A lens device comprising:
a barrel body which movably holds a focus lens in an optical axis direction;
a focus ring provided on an outer circumferential part of the barrel body and having a regulated rotation range;
a rotation position detecting unit which detects a rotation position in the rotation range of the focus ring;
a touch sensor provided on the outer circumferential part of the barrel body so as to be adjacent to the focus ring; and
a control device which performs absolute position control of moving the focus lens to an absolute position corresponding to the rotation position detected by the rotation position detecting unit and relative position control of moving the focus lens to a relative position corresponding to a sliding amount on the touch sensor on an outer circumferential surface in a circumferential direction,
wherein the control device performs rough adjustment of a position of the focus lens according to rotation of the focus ring, and performs fine adjustment of the position of the focus lens according to the sliding amount on the touch sensor.

17. The lens device according to claim 16, wherein the control device has an autofocus control function of moving the focus lens to a position where a subject is automatically focused, and starts an operation of autofocusing of the focus lens if a touch has been detected at the touch sensor.

18. The lens device according to claim 17, wherein if sliding has been detected at the touch sensor after end of the autofocusing, the control device moves the focus lens to the relative position corresponding to the sliding amount on the touch sensor with reference to an absolute position determined by the autofocusing.

* * * * *